United States Patent
Henry et al.

(10) Patent No.: US 10,794,304 B2
(45) Date of Patent: Oct. 6, 2020

(54) METHOD AND SYSTEMS FOR EGR CONTROL

(71) Applicant: Transportation IP Holdings, LLC, Norwalk, CT (US)

(72) Inventors: Luke Michael Henry, Erie, PA (US); James Robert Mischler, Girard, PA (US); David Zielinski, Erie, PA (US); Samuel Lyle Hazen, Mayville, NY (US); Ralph Wheeland, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 390 days.

(21) Appl. No.: 15/941,291

(22) Filed: Mar. 30, 2018

(65) Prior Publication Data
US 2018/0223753 A1 Aug. 9, 2018

Related U.S. Application Data

(62) Division of application No. 14/492,194, filed on Sep. 22, 2014, now Pat. No. 9,951,701.

(51) Int. Cl.
*F02D 41/00* (2006.01)
*F02D 41/18* (2006.01)
(Continued)

(52) U.S. Cl.
CPC ......... *F02D 41/0052* (2013.01); *F02D 41/18* (2013.01); *F02M 26/08* (2016.02);
(Continued)

(58) Field of Classification Search
CPC ...... F02D 21/08; F02D 41/06; F02D 41/0007; F02D 41/18; F02D 41/0052;
(Continued)

(56) References Cited

U.S. PATENT DOCUMENTS

| | | |
|---|---|---|
| 5,704,340 A | 1/1998 | Togai |
| 6,009,709 A | 1/2000 | Bailey |

(Continued)

FOREIGN PATENT DOCUMENTS

| | | |
|---|---|---|
| DE | 102013213352 A1 | 10/2014 |
| EP | 0892164 A2 | 1/1999 |

(Continued)

OTHER PUBLICATIONS

Australia Patent Office, Examination Report Issued in Application No. 2015227535, dated May 12, 2016, 7 pages.

*Primary Examiner* — Phutthiwat Wongwian
*Assistant Examiner* — Arnold Castro
(74) *Attorney, Agent, or Firm* — McCoy Russell LLP

(57) ABSTRACT

Various methods and systems are provided for estimating fresh intake air flow. In one example, a system comprises an engine having an intake manifold to receive fresh intake air and an exhaust gas recirculation (EGR) system to supply EGR to the intake manifold, where flow of EGR through the EGR system is controlled by one or more exhaust valves. The system further includes a controller configured to adjust a position of the one or more exhaust valves based on an estimated fresh intake air flow rate, where during a first set of operating conditions, the fresh intake air flow rate is estimated based on a total gas flow rate into the engine and further based on a current position of the one or more exhaust valves, intake manifold pressure, air-fuel ratio, and fuel flow to one or more cylinders of the engine.

20 Claims, 6 Drawing Sheets

(51) Int. Cl.
  *F02M 26/47* (2016.01)
  *F02M 26/16* (2016.01)
  *F02M 26/08* (2016.01)
  *F02M 26/17* (2016.01)
  *F02M 26/63* (2016.01)
  *F02M 26/43* (2016.01)
  *F02D 41/06* (2006.01)
  *F02D 41/14* (2006.01)

(52) U.S. Cl.
  CPC ............ *F02M 26/16* (2016.02); *F02M 26/17* (2016.02); *F02M 26/43* (2016.02); *F02M 26/47* (2016.02); *F02M 26/63* (2016.02); *F02D 41/0007* (2013.01); *F02D 41/0082* (2013.01); *F02D 41/06* (2013.01); *F02D 41/1454* (2013.01); *F02D 2041/001* (2013.01); *F02D 2200/0402* (2013.01); *F02D 2200/0414* (2013.01); *Y02T 10/47* (2013.01)

(58) Field of Classification Search
  CPC ............ F02D 41/0082; F02D 41/1454; F02D 2041/001; F02D 2200/04; F02D 2200/06; F02D 2200/0402; F02D 2200/0414; F02M 26/08; F02M 26/16; F02M 26/17; F02M 26/43; F02M 26/47; F02M 26/63; Y02T 10/47
  USPC ........................................................ 123/568
  See application file for complete search history.

(56) References Cited

U.S. PATENT DOCUMENTS

| | | | |
|---|---|---|---|
| 6,035,640 A * | 3/2000 | Kolmanovsky | F02B 37/24 123/676 |
| 6,422,219 B1 | 7/2002 | Savonen et al. | |
| 6,601,387 B2 | 8/2003 | Zurawski et al. | |
| 6,981,492 B2 | 1/2006 | Barba et al. | |
| 7,047,741 B2 | 5/2006 | Gray, Jr. | |
| 7,174,713 B2 | 2/2007 | Nitzke et al. | |
| 7,181,332 B1 | 2/2007 | Vick et al. | |
| 7,254,948 B2 | 8/2007 | Gustafson et al. | |
| 7,389,173 B1 | 6/2008 | Wang | |
| 7,540,270 B2 | 6/2009 | Kang et al. | |
| 7,963,275 B2 | 6/2011 | Stein et al. | |
| 8,307,814 B2 | 11/2012 | Leroy et al. | |
| 8,521,354 B2 | 8/2013 | Sasaki | |
| 8,677,748 B2 | 3/2014 | Brahma et al. | |
| 2002/0179060 A1 | 12/2002 | Engel et al. | |
| 2003/0075158 A1 | 4/2003 | Milos et al. | |
| 2003/0145836 A1 | 8/2003 | Linna et al. | |
| 2005/0114011 A1 * | 5/2005 | Itoyama | F02D 41/18 701/108 |
| 2008/0078176 A1 * | 4/2008 | de Ojeda | F02D 21/08 60/605.2 |
| 2008/0127938 A1 * | 6/2008 | Hagari | F02D 41/18 123/439 |
| 2009/0007888 A1 | 1/2009 | Sarlashkar et al. | |
| 2009/0178388 A1 | 7/2009 | Schumacher et al. | |
| 2009/0250042 A1 * | 10/2009 | Sujan | F02B 47/08 123/568.21 |
| 2011/0000470 A1 | 1/2011 | Roth | |
| 2011/0184632 A1 | 7/2011 | Kang et al. | |
| 2013/0055711 A1 | 3/2013 | Hofer et al. | |
| 2014/0000573 A1 | 1/2014 | Hu et al. | |
| 2014/0174413 A1 | 6/2014 | Huang et al. | |
| 2015/0345417 A1 * | 12/2015 | Zhu | F02D 41/144 73/114.32 |
| 2016/0076473 A1 * | 3/2016 | Huang | F02M 26/21 701/108 |

FOREIGN PATENT DOCUMENTS

| | | |
|---|---|---|
| EP | 1398490 A2 | 3/2004 |
| JP | H08326595 A | 12/1996 |
| JP | H08338318 A | 12/1996 |
| JP | H0914016 A | 1/1997 |

* cited by examiner

METHOD AND SYSTEMS FOR EGR CONTROL

BACKGROUND

Technical Field

Embodiments of the subject matter disclosed herein relate to an exhaust gas recirculation system.

Discussion of Art

Exhaust gas recirculation (EGR) lowers peak combustion temperatures and hence lowers NOx production, and thus engine systems may be configured to tightly control EGR in order to maintain emissions under designated limits. Accurate control of the amount of EGR supplied to the engine relies on knowledge of the overall and/or fresh intake air flow to the engine. Particularly in engine systems that lack an intake air flow sensor, mechanisms for determining the intake air flow rate may be inaccurate, slow, and/or noisy, at least during some operating conditions, thus hindering accurate EGR control.

BRIEF DESCRIPTION

In one embodiment, a system comprises an engine having an intake manifold to receive fresh intake air and an exhaust gas recirculation (EGR) system to supply EGR to the intake manifold, where flow of EGR through the EGR system is controlled by one or more exhaust valves. The system further includes a controller configured to adjust a position of the one or more exhaust valves based on an estimated fresh intake air flow rate, where during a first set of operating conditions, the fresh intake air flow rate is estimated based on a total gas flow rate into the engine and further based on a current position of the one or more exhaust valves, intake manifold pressure, air-fuel ratio, and fuel flow to one or more cylinders of the engine.

DETAILED DESCRIPTION

The following description relates to adjusting a position of one or more exhaust valves based on an estimated fresh intake air flow rate. The one or more exhaust valves may be exhaust gas recirculation (EGR) valves that regulate flow of EGR to the intake of the engine, and/or the one or more exhaust valves may include valves that affect the flow of EGR, such as exhaust backpressure valves, turbine flow valves, etc. The estimated fresh intake air flow rate may be estimated according to one or more estimations, depending on engine operating conditions. For example, during a first set of operating conditions, the fresh intake air flow rate may be estimated based on a total gas flow rate into the engine and further based on a current position of the one or more exhaust valves, intake manifold pressure, air-fuel ratio, and fuel flow. In another example, during a second set of operating conditions, the fresh intake air flow rate may be estimated based the total gas flow rate into the engine and further based on the current position of the one or more exhaust valves and intake manifold pressure, and not based on air-fuel ratio and fuel flow to cylinders of the engine. In this way, the rate of air flow into the intake may be determined accurately during various operating conditions, thus maintaining accurate control of the amount of EGR delivered to the intake.

Figure 1:
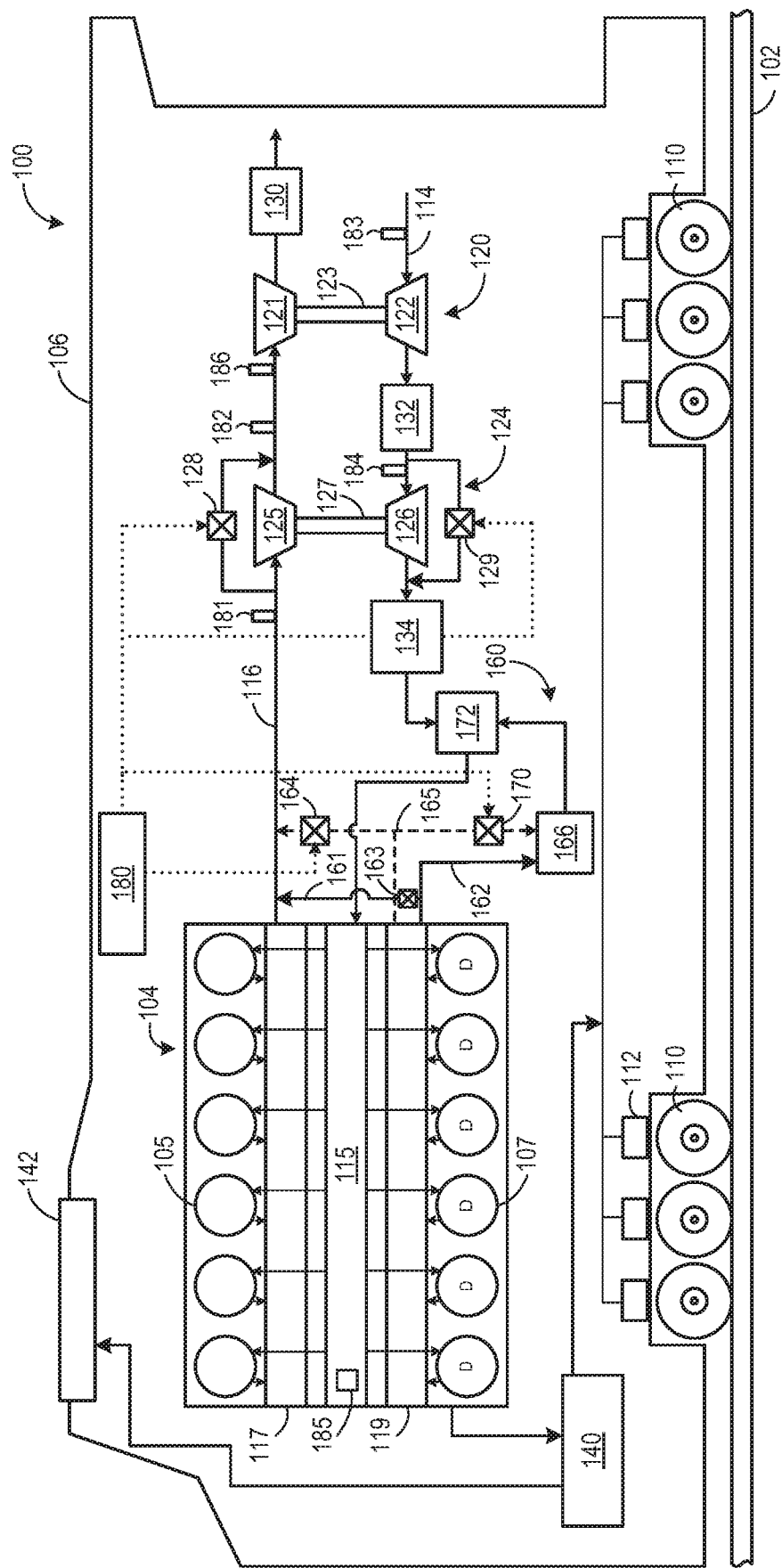
FIG. 1 shows a schematic diagram of a vehicle according to an embodiment of the present disclosure.
Figure 2:
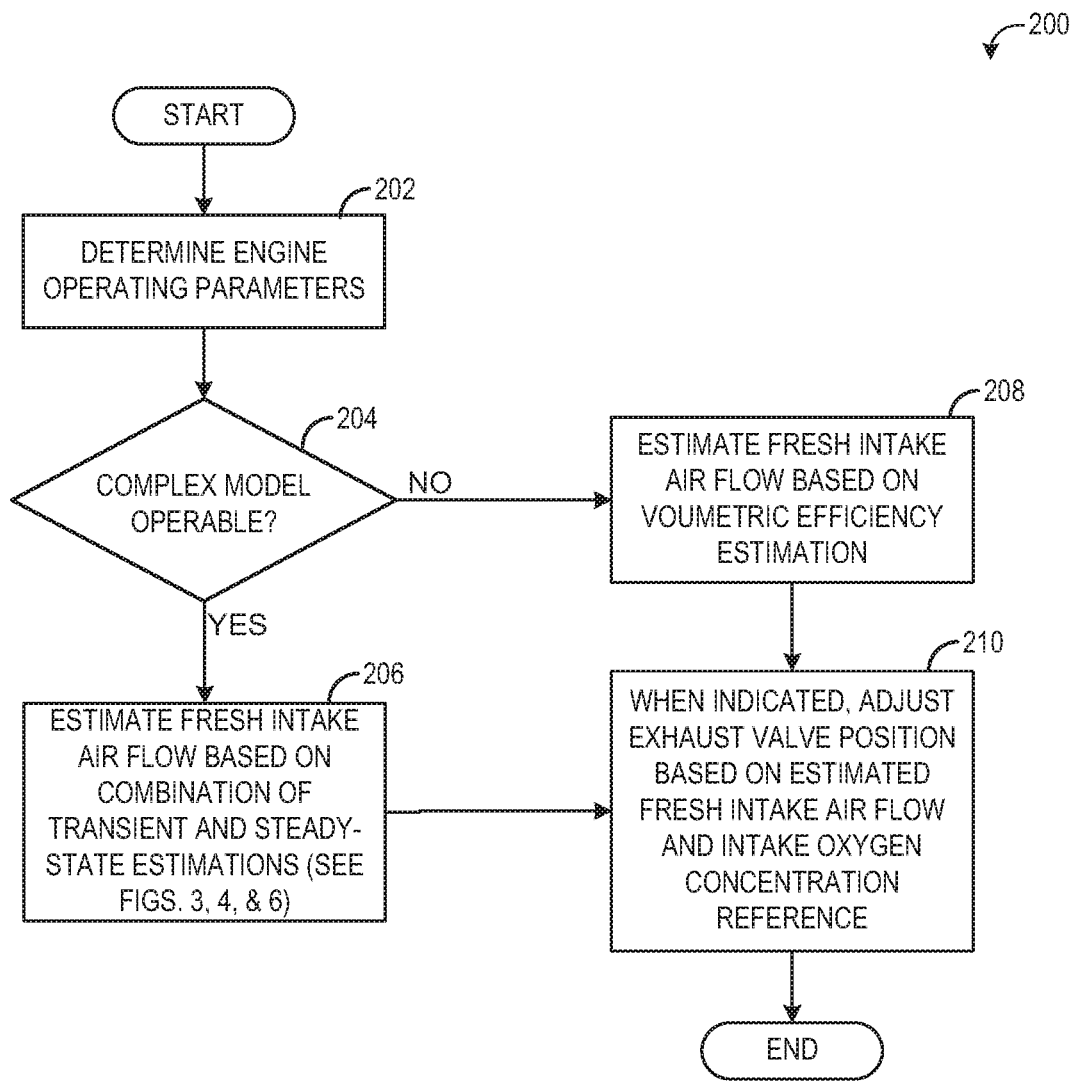
FIG. 2 is a flow chart illustrating a method for adjusting engine operation based on an estimated fresh intake air flow.
Figure 3:
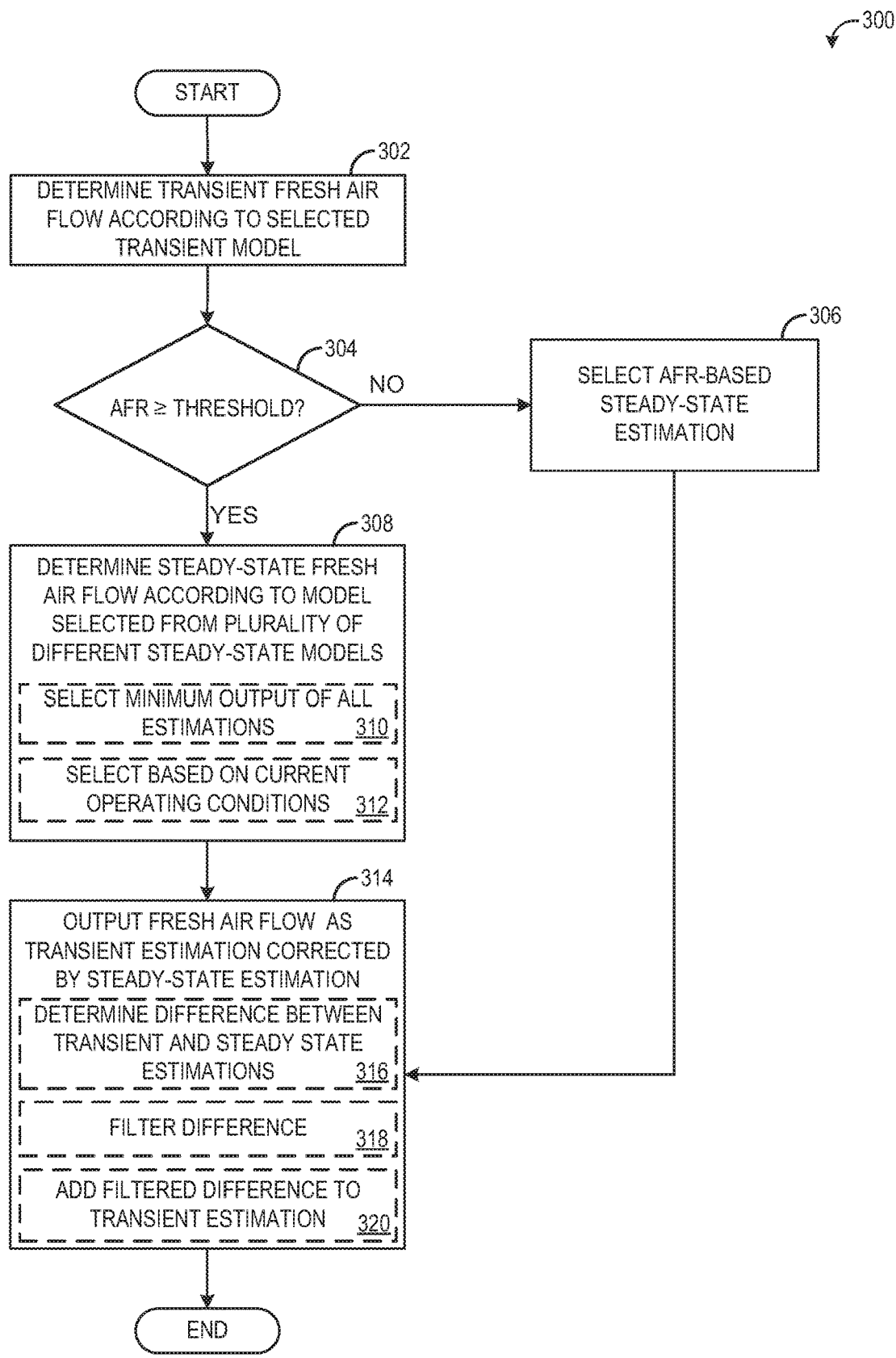
FIG. 3 is a flow chart illustrating a method for estimating a fresh intake air flow.
Figure 4:
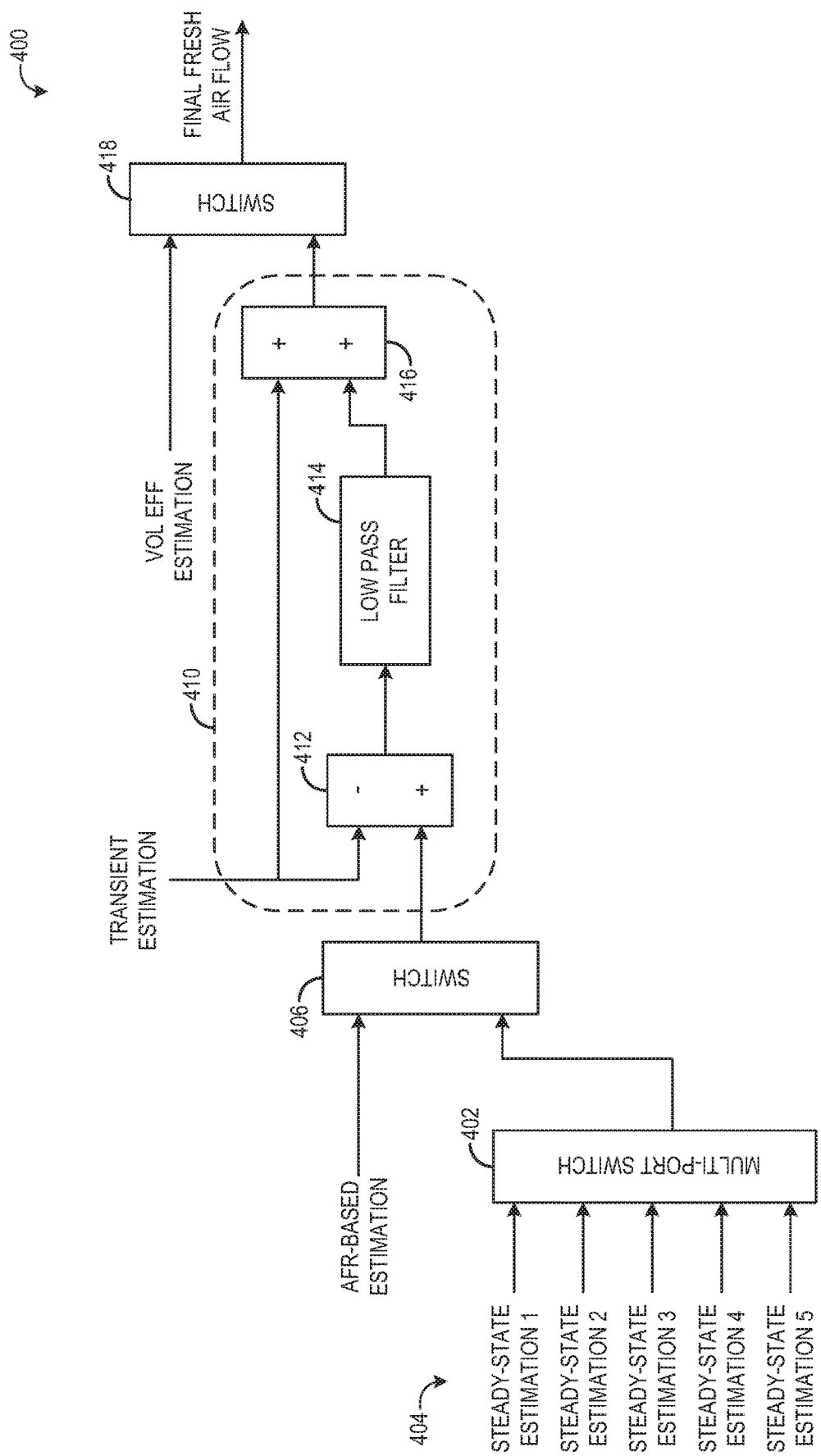
FIG. 4 is a diagram illustrating a control process for estimating a fresh intake air flow.
Figure 5:
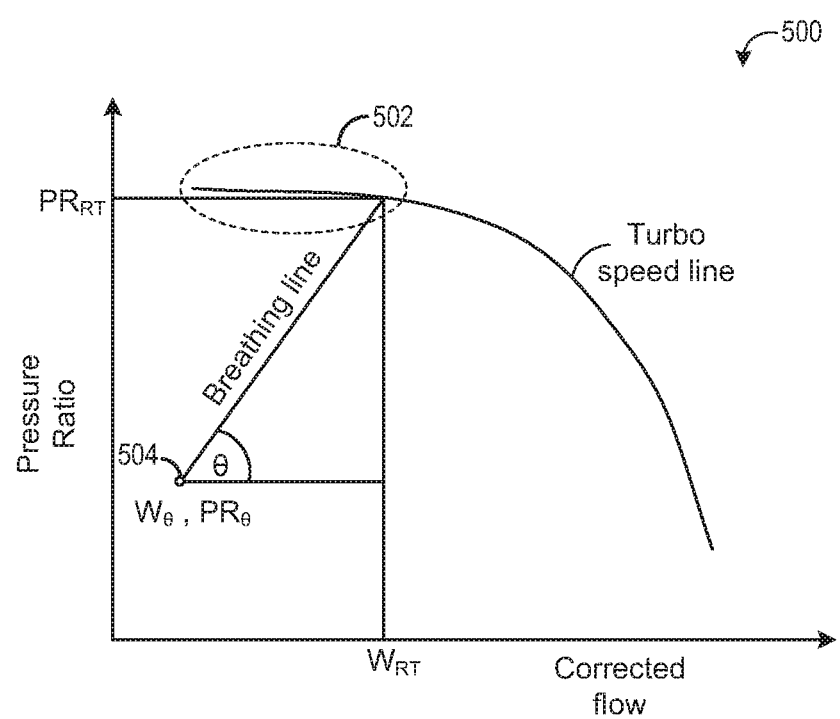
FIG. 5 is an example compressor flow map.
Figure 6:
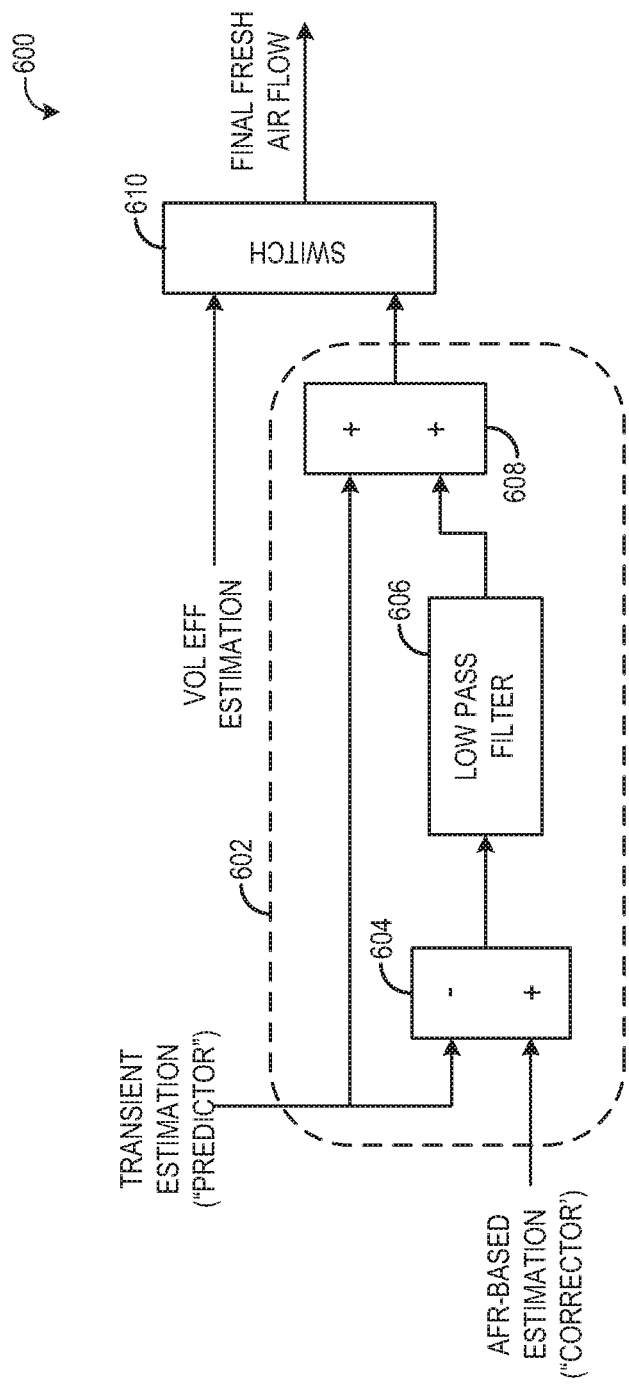
FIG. 6 is a diagram illustrating another control process for estimating a fresh intake air flow.

FIG. 1 illustrates an example vehicle system including an engine and EGR system that may be controlled by a controller according to the methods illustrated in FIGS. 2-3. Specifically, the methods of FIGS. 2-3 provide for selecting one or more models for estimating the fresh air flow rate, based on current operating conditions, and adjusting one or more exhaust valves based on the estimated fresh air flow rate. FIGS. 4 and 6 illustrate control diagrams for estimating a fresh air flow rate under a variety of operating conditions. FIG. 5 illustrates a compressor flow map that may be used in one of the models for estimating the fresh air flow rate.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for determining intake air flow, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, the intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle.

In one example, the engine is a diesel engine that combusts air and diesel fuel through compression ignition. As such, the engine may include a plurality of fuel injectors to inject fuel to each cylinder of the engine. For example, each cylinder may include a direct injector that receives fuel from a high-pressure fuel rail. In other non-limiting embodiments, the engine may combust fuel including gasoline, kerosene, biodiesel, or other petroleum distillates of similar density through compression ignition (and/or spark ignition). In a still further example, the engine may combust gaseous fuel, such as natural gas. The gaseous fuel may be ignited via compression ignition of injected diesel fuel, herein referred to as multi-fuel operation, or the gaseous fuel may be ignited via spark ignition. The gaseous fuel may be supplied to the cylinders via one or more gas admission valves, for example. In further examples, the fuel may be supplied to the cylinders via port injection. The liquid fuel (e.g., diesel) may be stored in a fuel tank located on board the rail vehicle. The gaseous fuel may be stored in a storage tank located on board the rail vehicle or on board a different vehicle operably coupled to the rail vehicle.

In one embodiment, the rail vehicle is a diesel-electric vehicle (or diesel/gaseous fuel-electric hybrid). As depicted in FIG. 1, the engine is coupled to an electric power generation system, which includes an alternator/generator 140 and electric traction motors 112. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of a plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders are coupled to the exhaust passage to route exhaust gas from the engine to atmosphere (after it passes through an exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a valve 163. The valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a first valve 164 disposed between the exhaust passage and the alternate EGR passage.

The first valve and second valve may be on/off valves controlled by the control unit 180 (for turning the flow of EGR on or off), or they may control a variable amount of EGR, for example. In some examples, the first valve may be actuated such that an EGR amount is reduced (exhaust gas flows from the EGR passage to the exhaust passage). In other examples, the first valve may be actuated such that the EGR amount is increased (e.g., exhaust gas flows from the exhaust passage to the EGR passage). In some embodiments, the alternate EGR system may include a plurality of EGR valves or other flow control elements to control the amount of EGR.

In such a configuration, the first valve is operable to route exhaust from the donor cylinders to the exhaust passage of the engine and the second valve is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some examples, the valves may be actuated such that one of the first and second valves are normally open and the other is normally closed.

In other examples, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of turbochargers 120 and 124 in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger is provided with a turbine bypass valve 128 which allows exhaust gas to bypass the second turbocharger. The turbine bypass valve may be opened, for example, to divert the exhaust gas flow away from the second turbine. In this manner, the rotating speed of the compressor, and thus the boost provided by the turbochargers to the engine may be regulated during steady state conditions. Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor to avoid compressor surge, for example. In some embodiments, first turbocharger may also be provided with a compressor bypass valve, while in other embodiments, only first turbocharger may be provided with a compressor bypass valve. Further, in some examples, one or more of the turbochargers may be variable geometry turbochargers (VGT).

The vehicle system further includes an exhaust treatment system 130 coupled in the exhaust passage in order to reduce regulated emissions. As depicted in FIG. 1, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system further includes the control unit 180 (also referred to as a controller), which is provided and configured to control various components related to the vehicle system. In one example, the control unit includes a computer control system. The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect one or more of exhaust temperature and pressure. Further, one or more sensors 186 in the exhaust passage may detect exhaust oxygen concentration, exhaust NOx concentration, exhaust particulate matter concentration, or other parameters. One or more sensors 185 positioned in the intake manifold (as illustrated) or in the intake passage may measure manifold pressure, manifold temperature, or other parameters. Additional sensors may include, but are not limited to, engine speed, engine load, boost pressure, ambient pressure, exhaust temperature, exhaust pressure, etc. Correspondingly, the control unit may control the vehicle system by sending commands to various components such as traction motors, alternator, cylinder valves, throttle, heat exchangers, wastegates or other valves or flow control elements, etc.

The control unit may be configured to estimate fresh and/or overall intake air flow. For example, in some configurations, an intake air flow sensor may not be present, or if an intake air flow sensor is present, it may not be operable under all conditions (e.g., it may not measure air flow accurately during times of low flow rate, low temperature, etc.), and thus the intake air flow may be estimated based on one or more engine operating parameters. The fresh intake air flow may refer to intake air flow that excludes EGR, including ambient air from outside the engine that may or may not be filtered. In some examples, the fresh intake air may include air other than ambient air, such as purge air or other gas sources, while still excluding EGR. The overall or total intake gas flow refers to all the air that is inducted into the cylinders, and includes the fresh air and EGR. The overall or fresh intake air flow may include a flow mass, flow rate, flow amount, or other suitable estimation. Based on the estimated intake air flow and a reference intake oxygen concentration, an amount of EGR to be directed to the intake may be determined, and based on the amount of EGR, one or more exhaust valves may be adjusted.

The fresh and/or overall intake air flow may be estimated according to a number of different models. Each of the different models may be based on different sets of inputs, and thus may result in different intake air flow estimations. Further, each of the different models may have different levels of noise, may have a high accuracy under some conditions but not others, may include inputs that are only available during certain conditions, etc. Thus, no single model may accurately estimate intake air flow at all times. To ensure a reliable, accurate air flow estimation is always available, one or more of the models may be selected to estimate intake air flow, based on the current operating conditions.

In one example, intake air flow may be estimated using a volumetric efficiency model, where the volumetric efficiency of the engine (based on intake manifold conditions) coupled with engine speed describes the total air flow into the cylinders. Briefly, the volumetric efficiency of an engine is the ratio of actual air flow into the cylinders to the theoretical maximum air flow possible (based on the known hardware configuration of the engine, e.g., the displacement of the engine). The volumetric efficiency may be determined based on engine speed, exhaust pressure, manifold air pressure, and manifold air temperature, and may provide an accurate estimation of intake air flow during both transient and steady state conditions. However, the volumetric efficiency model only estimates the total air flow into the engine, and thus cannot account for the presence of EGR in the intake. As such, the volumetric efficiency model may be relied only when EGR is deactivated.

A plurality of other intake air flow models may be used when EGR is active. In an example, an air-fuel ratio model may be used to estimate fresh intake air flow based on air-fuel ratio (AFR) and fuel flow. The AFR may be determined based on feedback from an exhaust oxygen sensor (and further based on sensed or estimated humidity in some examples), and the fuel flow may be determined from fuel injector maps and assumption or modeling of fuel density. The AFR-based model may be accurate under most steady-state operating conditions. However, during idle conditions or other conditions where AFR is very high, minor changes in sensed exhaust oxygen concentration can cause large changes in the determined AFR, and the accuracy of the AFR-based model may be low during conditions of high AFR. Further, the transient response of the AFR-based model may be low due to the latency of the oxygen sensor in responding to changes in exhaust oxygen concentration during transient conditions. Thus, the AFR-based model may be relied during conditions of moderate to high load where AFR is relatively low and during steady-state operation. However, to counteract the latency in the oxygen sensor output, the fuel flow signal may be subject to a transport delay/lag in order to match the timing of the oxygen sensor output, and thus if the latency is compensated, the AFR-model may be operable during transient conditions. In some examples, the dynamics of the AFR signal may be synchronized with the fuel flow signal in the time domain. This may allow a more accurate AFR and fuel flow multiplication result, thus improving the transient accuracy of the intake air flow estimation. This may improve the overall knowledge of intake fresh air flow.

In another example, the fresh intake air flow may be estimated according to an exhaust valve position model. The exhaust valve position model may determine total intake air flow to the cylinders based on the volumetric efficiency model, and then the amount of EGR in the intake may be determined based on the position of the one or more exhaust valves that affect EGR flow. In a first example of an exhaust valve position model, the exhaust valve position(s) is entered into a map that outputs an EGR rate based on the position(s) and intake manifold pressure, and the EGR rate is multiplied by the output of the volumetric efficiency model to determine the fresh air intake flow. This model is responsive during transient conditions, but may lack accuracy due to factors that can affect the actual EGR rate, such as exhaust pressure, not being accounted for. In a second example of an exhaust valve positon model, rather than simply relying on the exhaust valve positon, at least one of the exhaust valves is characterized as a variable-size orifice, and compressible gas flow equations are applied to provide a more detailed estimation of flow through the valve.

In a further example, fresh intake air flow may be estimated according to a compressor flow model. The compressor flow model uses a predetermined compressor map (e.g., a high-pressure compressor in a two-stage turbocharger system) with compressor pressure ratio and corrected turbo speed inputs (the turbo speed may be corrected for intake air temperature in one example). The map outputs a corrected compressor air flow, which is then uncorrected according to the compressor inlet conditions. However, this model may be inaccurate and/or noisy when the compressor is operating near the surge line of the map where the turbo speed lines tend to be near horizontal.

For example, FIG. 5 illustrates an example compressor map 500 that plots corrected compressor flow (W) as a function of compressor pressure ratio (PR) for given turbo speeds. Map 500 illustrates a single constant turbo speed line, but it will be appreciated that other turbo speed lines may be present. In region 502, the turbo speed line is substantially horizontal, and thus minor changes in pressure ratio (whether real or due to error) can lead to large changes in compressor air flow.

An alternate compressor flow model may be used that accounts for the large compressor flow output variations that may arise from small pressure ratio variations when operating near the surge line (and thus in the region of the compressor map that has relatively flat turbo speed lines). In the alternate model, the engine breathing line angle is learned over time and not allowed to shift back and forth with the undesired variation. In this way, the compressor map air flow look up is forced to come from the learned breathing line. A triangulation is performed on the compressor map look up (e.g., look-up using pressure ratio across the compressor, flow, and turbo speed on the breathing line) to avoid noise while maintaining dynamics that reflect real world conditions.

For example, as shown in FIG. 5, an actual pressure ratio and compressor flow measurement may be performed ($PR_{RT}$ and $W_{RT}$, respectively) and an engine breathing line determined. An engine breathing line refers to the approximately straight line that appears on the compressor map when operating at a constant speed with varying load. Then, a (possibly "noisy") real time breathing line angle ($O_{RT}$) may be calculated. As shown in FIG. 5, the real time breathing angle represents the angle between the operation point in real time (described by $PR_{RT}$ and $W_{RT}$) and the breathing line anchor point 504 (described by $PR_\theta$ and $W_\theta$). The breathing line anchor point is a static, predetermined point that reflects the approximate point where all engine breathing lines tend to converge on the compressor map. The $\theta_{RT}$ is then filtered (by a low pass filter, or similar) to get a filtered breathing line angle, $\theta_F$. This may include a slow filter if $|\theta_{RT}-\theta_F|<X_1$, or a fast filter if $|\theta_{RT}-\theta_F|\geq X_1$. Here, the slow filter has a relatively low bandwidth that allows only slower dynamics through to $\theta_F$, while the fast filter has a relatively high bandwidth that also allows faster dynamics through to $\theta_F$. The threshold $X_1$ represents the threshold at which the transition is made between the slow and fast filters. This dual-level filtering allows for the filtered breathing line angle, $\theta_F$, to be heavily filtered (and thus have a relatively clean signal with low "noise") during times of operation along a static breathing line, but also allows the $\theta_F$ to change quickly (thus allowing the calculated breathing line, itself, to change quickly) if the apparent breathing line is, in fact, changing quickly. Finally, compressor flow is determined using the filtered breathing line angle, $\theta_F$, and corrected turbo speed. By determining the filtered breathing line angle, the compressor map shifts from being used in a Cartesian coordinate fashion to that which is more similar to a polar coordinate system. This allows for an output flow signal that is less susceptible to "noise" when operating near surge where the turbo speed lines tend to be near horizontal.

In a still further example, fresh intake air flow may be estimated according to a NOx-based model. The NOx-based model may determine the total cylinder air flow using the volumetric efficiency model described above, determine EGR rate using exhaust NOx concentration, and then multiply the total intake air flow by the EGR rate to determine the estimated fresh intake air flow. For example, a map or look-up table may output an EGR rate based on the exhaust NOx concentration. The EGR rate determination may be made more accurate may accounting for factors likely to affect NOx, including engine speed, fueling to the cylinders that provide EGR (e.g., donor cylinders), and ambient humidity. Engine-out NOx may provide a reliable indication of EGR rate, even when AFR is very high.

Thus, a variety of intake air flow estimation models are available, and each estimation model has its own strengths and weaknesses. As will be explained in more detail below with respect to FIGS. 2-4, depending on operating conditions, one or more of the intake air flow estimation models may be used to arrive at final intake air flow estimation for controlling engine operation, including exhaust valve position adjustment. Briefly, the output from multiple intake air flow estimation models may be input into a "complex" model that leverages the response of the estimation models to changes in operating conditions with the accuracy of the models during steady-state conditions. However, as the complex model relies on a variety of estimation models (and hence a variety of inputs), it is not operable during all operating conditions. For example, one or more of the sensors used to provide feedback to one or more of the estimation models may not be reliable at low temperature, and thus the complex model may not be reliable during cold engine starts. During these conditions, which may frequently overlap with EGR deactivation, the volumetric efficiency model alone may be used.

Referring now to FIG. 2, a method 200 for adjusting engine operation based on an estimated fresh intake air flow is presented. Method 200 may be carried out by a controller, such as control unit 180 of FIG. 1, according to non-transitory instructions stored thereon. At 202, method 200 includes determining engine operating parameters. The determined engine operating parameters may include, but are not limited to, engine temperature, engine speed, engine load, and EGR status/rate (e.g., if EGR is activated or deactivated). At 204, it is determined if the complex model used to calculate fresh intake air flow is operable. As explained above, and explained in more detail with respect to FIGS. 3-4 and 6, the complex model (also referred to as a predictor/corrector) receives as input, the output from a plurality of different intake air flow estimation models. Each of the respective estimation models includes one or more sensed inputs, such exhaust oxygen concentration, exhaust NOx concentration, or turbo speed, that may require a minimum exhaust temperature or exhaust flow rate be reached before the sensed input is reliable. Thus, the complex model may only be operable under certain conditions. In one example, the complex model may not be operable following an engine start (e.g., before turbine speed has reached a threshold speed), when engine temperature is below a threshold (e.g., when a NOx or $O_2$ sensor is below its light-off temperature), and/or when EGR is deactivated.

If it is determined that the complex model is operable, for example if EGR is activated or if the engine is not operating under cold start conditions, method 200 proceeds to 206 to estimate a fresh intake air flow using the complex model, which will be explained in more detail below with respect to FIGS. 3, 4, and 6.

Briefly, the complex model outputs a final fresh intake air flow based on a combination of transient and steady-state estimations of the fresh intake air flow. Method 200 then proceeds to 210 to adjust the position of one or more exhaust valves based on the estimated fresh intake air flow and a reference intake oxygen concentration, when indicated. Adjusting the one or more exhaust valve positions may be indicated when actual intake oxygen concentration (either modeled or sensed) is different from the reference intake oxygen concentration, for example, or when the reference intake oxygen concentration changes (due to a change in commanded engine load, for example). The one or more exhaust valves may include one or more valves to control flow of EGR through an EGR passage, such as valves 163, 164, and/or 170, valve 128, or other valves. By adjusting the one or more exhaust valves, the amount of EGR introduced to the intake will change, in order to bring the intake oxygen concentration to the reference concentration. In some examples, to adjust the EGR additionally or alternatively to adjusting the one or more exhaust valves, fueling to EGR cylinders (e.g., donor cylinders) may be adjusted, a variable geometry turbocharger position may be adjusted, or other factor that may affect EGR may be adjusted. Method 200 then returns.

Returning to 204, if it is determined that the complex model is not operable, for example if EGR is deactivated or if the engine is operating under cold start conditions, method 200 proceeds to 208 to estimate the fresh intake air flow based on the volumetric efficiency model described above, where the fresh intake air flow is assumed to be the same as the total air flow into the cylinders, and is based on engine speed, exhaust pressure, intake manifold pressure, and intake manifold temperature. Method 200 then proceeds to 210 to adjust the exhaust valve position(s) based on the estimated fresh air flow, as described above.

While method 200 described above utilizes the complex model during conditions where the model is operable, and does not use the complex model during conditions where the model is not operable, it is to be understood that in some embodiments, the complex model may be utilized even if some of the inputs are not reliable. This may include conditions where EGR is activated, and thus the volumetric efficiency model may not be used, as it does not account for the effect of EGR on the overall intake air flow.

Turning now to FIG. 3, a method 300 for estimating a fresh intake air flow based on the complex, predictor/corrector model is presented. Method 300 may be carried out by the control unit 180, for example during the execution of method 200, as described above. Method 300 combines a first fresh intake air flow estimation with a second fresh intake air flow estimation in order to reach a final fresh air flow estimation. The first fresh intake air flow estimation may be output from a "transient" model that is determined to have a fast response rate during changing conditions, while the second fresh intake air flow estimation may be output from a "steady-state" model determined to have the best accuracy during steady-state (e.g., non-changing) conditions. Further, one or both of the transient model and steady-state model used to calculate the fresh intake air flow estimations input into the complex model may be selected from a plurality of different models, based on operating conditions. The possible transient and steady-state models may include all the models described above, including the volumetric efficiency model, the AFR-based model, both exhaust valve position models, both compressor flow models, and the NOx-based model.

At 302, method 300 includes determining a transient fresh intake air flow based on a selected transient fresh intake air flow model. The selected transient fresh intake air flow model may be selected from among a plurality of different transient fresh intake air flow models. The transient fresh intake air flow models may include intake air flow estimation models that are relatively accurate during transient conditions, respond quickly to changing inputs (e.g., the sensors that provide feedback to the models do not experience a large amount of latency), and/or have high signal-to-noise ratios. The transient fresh intake air flow models may include the two exhaust valve position models and the two compressor flow based models described above. The transient fresh intake air flow estimation model output selected as input into the complex model may be selected based on operating parameters in one example. In another example, rather than selecting from among a plurality of transient fresh intake air flow estimation models, the transient fresh air flow may be estimated using the exhaust valve position model, where fresh intake air flow is estimated based on the total air flow to the cylinders (as determined by the volumetric efficiency model), exhaust valve (e.g., EGR valve) position, and intake manifold pressure. The exhaust valve position model may provide increased accuracy with fast transient response relative to the other fresh intake air flow estimation models. In some examples, if it is determined that the exhaust valve position information is not reliable (e.g., if a valve position feedback sensor is degraded or otherwise not providing reliable feedback), rather than utilizing the exhaust valve position model, one of the compressor flow models may be utilized.

At 304, method 300 includes determining if air-fuel ratio (AFR) is greater than or equal to a threshold AFR. The threshold AFR may be a relatively high AFR, such as a typical AFR observed during idle or very low load conditions. In one example, the threshold AFR may be in a range between 80:1 and 100:1. If AFR is not greater than the threshold, method 300 proceeds to 306 to select the AFR-based steady-state estimation of the fresh intake air flow as input into the complex model, and proceeds to 314, explained below. As explained above, the AFR-based model outputs a fresh intake air flow estimation based on AFR and fuel flow, where the AFR is determined based on feedback from an exhaust oxygen sensor. During conditions of high AFR (e.g., low fuel flow, high intake air flow), small errors in exhaust oxygen measurements can translate into large AFR errors and hence large fresh intake air flow estimation errors. As such, while the AFR-based model is accurate under mid-to-high load conditions (e.g., lower AFR conditions), it is not as accurate during high AFR conditions (e.g., AFRs of 80:1 or higher). Thus, if AFR is higher than the threshold at 304, rather than relying on the AFR-based model, method 300 proceeds to 308 to estimate a steady-state fresh intake air flow based on a selected steady-state model, selected from among a plurality of different steady-state models.

The steady-state model may be selected according to a predetermined configuration. In one example, fresh intake air flow estimations from all of the models described above may be input into a multi-port switch, and the minimum fresh intake air flow estimation from all the models selected to be used as input into the complex model, as indicated at 310. Such a configuration allows for erring on the low side with respect to fresh intake air flow, resulting in an EGR flow calculation erring on the high side, and thus the actual delivered EGR may err on the low side, adding margin to minimize smoke production. In another example, the desired steady-state model may be selected based on operating conditions, as indicated at 312. In one specific example, when engine load is below a threshold (e.g., when operating at idle), the selected steady-state model may be the NOx-based model, where fresh intake air flow is estimated based on total cylinder air flow (determined using the volumetric efficiency model), exhaust NOx concentration, and further based on humidity, engine speed, and/or cylinder fuel amounts (specifically to cylinders that produce EGR, otherwise referred to as donor cylinders).

Once a transient fresh intake air flow estimation and a steady-state fresh intake air flow estimation are selected, method 300 proceeds to 314 to output a final fresh air flow estimation as the transient estimation corrected by the steady-state estimation. Correcting the transient estimation by the steady-state estimation may include determining a difference between the transient and steady-state state estimations at 316, filtering the difference at 318, and adding the filtered difference to the transient fresh intake air flow estimation at 320. Method 300 then ends.

FIG. 4 is a control diagram 400 that illustrates the process of estimating a fresh intake air flow according to methods 200 and 300 described above. Control diagram 400 includes a plurality of fresh intake air flow estimations, determined according the estimation models described above, that are input into multiple switches and a complex model to determine a final fresh intake air flow.

Control diagram includes a multi-port switch 402, where a plurality of steady-state fresh intake air flow estimations 404, output from a plurality of fresh intake air flow estimation models, are input. The multi-port switch selects one estimation, based on a predetermined switch configuration. While five separate steady-state estimations are illustrated in control diagram, it is to be understood that the diagram is illustrative in nature and not limiting, and thus other switch configurations are possible. In one example, steady-state estimation 1 includes the minimum of the fresh intake air flow estimations from the AFR-based model and the NOx-based model, steady-state estimation 2 includes the fresh intake air flow estimation from the AFR-based model, steady-state estimation 3 includes the fresh intake air flow estimation from the NOx-based model, steady-state estimation 4 includes the minimum of the fresh intake air flow estimations from the AFR-based model and the volumetric efficiency model, and steady-state estimation 5 includes the fresh intake air flow estimation from the compressor flow model. In a further example, an addition steady-state estimation may be included that is equal to the transient estimation, described below. The estimation output from the multi-port switch may be selected based on operating conditions, based on a minimum value, or other configuration.

The output from the multi-port switch 402 (e.g., the selected fresh intake air flow estimation) is fed into switch 406 along with an AFR-based estimation (e.g., the fresh intake air flow estimation determined using the AFR-based model). Switch 406 selects from the AFR-based estimation and the estimation output from switch 402 based on AFR, where low AFR results in the AFR-based estimation being selected and high AFR results in the estimation output from switch 402 being selected. The output from switch 406 (which may be referred to as the steady-state estimation) is fed into the complex predictor/corrector model 410.

The complex predictor/corrector model 410 includes a block 412, where the difference between the steady-state estimation and a selected transient estimation is determined. For example, the transient estimation may be subtracted from the steady-state estimation. As explained previously, the transient estimation may be a fresh intake air flow estimation determined using the exhaust valve position model (e.g., based on total cylinder air flow, exhaust valve position, and intake manifold pressure), or another suitable model. The difference from block 412 is fed into a low-pass filter 414 (although other filters, or no filter, are possible) and the filtered difference is fed into block 416, along with the transient estimation. The filtered difference and transient estimation may be added together at block 416. The output from block 416 may be the final fresh intake air flow estimation determined using the complex model 410, and may be input into switch 418.

Switch 418 selects either the output from the complex model or the fresh intake air flow estimation output from the volumetric efficiency model, based on whether it is determined the complex model is operable (which in some examples may include the complex model being operable when the transient estimation is operable, even if the steady-state estimation is not operable) and/or based on whether EGR is activated. In one example, if EGR is activated, the output from the complex model is selected, and if EGR is inactivated, the output from the volumetric efficiency model is selected, regardless of other operating conditions. In another example, the output from the complex model is selected if the complex model is operable, and the output from the volumetric efficiency model is selected if the complex model is not operable, regardless of EGR status. This may include selecting the output from the volumetric efficiency model when sensors used to determine the output from the complex model are not online, e.g., when the sensors have not reached light up temperature, are undergoing calibration, etc. The output from switch 418 is the final fresh air flow estimation that may be used to determine a target EGR flow rate and/or adjust other engine operating parameters.

The complex model described above with respect to FIGS. 3-4 determines a fresh intake air flow based on one or more fresh intake air flow estimations, including a volumetric efficiency based estimation, a transient estimation, and a steady-state estimation. As described above, the steady-state estimation may be selected from among a plurality of steady-state estimations, based on operating conditions. Likewise, the transient estimation may also be selected from among a plurality of transient estimations, based on operating conditions. While this complex model may provide accurate fresh intake air flow estimations across a wide range of operating conditions, it also is fairly complex and may be difficult to properly calibrate.

Thus, as described with respect to FIG. 6, a simplified version of the complex model may be executed. In the simplified version, the multi-port switch, as well as transient estimation selection may be dispensed with in favor of a single steady-state model (also referred to as the "corrector") and a single transient model (also referred to as the "predictor"), as described below.

FIG. 6 is a control diagram 600 that illustrates a simplified process of estimating a fresh intake air flow according to methods 200 and 300 described above. Control diagram 600 includes a predictor/corrector block 602 that outputs a fresh intake air flow estimation based on a combination of a transient and a steady-state model. The steady-state estimation used here is the AFR-based estimation, where fresh intake air flow is estimated based on AFR and fuel flow. The AFR-based estimation (the "corrector") is fed into a block 604, along with a transient estimation. The transient estimation used here (the "predictor") is the exhaust valve position based estimation, where fresh intake air flow is estimated based on volumetric efficiency, exhaust valve position, and intake manifold pressure. In some operating conditions, the AFR-based estimation may be unreliable, such as when AFR is high and/or when the exhaust oxygen sensor is not a light-off temperature. During these conditions, the difference between the corrector and the predictor (e.g., the output from block 604) may be zero.

At block 604, the difference between the corrector and the predictor is determined and fed into a filter at 606. The filtered output from block 606 is input into block 608 along with the predictor value, where the two values are summed. The output from block 608 is fed into switch 610.

Switch 610 selects from between the output of the predictor/corrector (e.g., the output from block 608) and the volumetric efficiency based estimation (e.g., the total intake air flow estimation that does not account for EGR). The selection between the two estimations may be based on whether the inputs into the predictor/corrector model are healthy, similar to the switch 418 described above. In some examples, in order to select the output from the predictor/corrector, only the predictor need be healthy. That is, even if AFR is high (e.g., 80:1 or greater) and/or the exhaust oxygen sensor is not operable, thus rendering the corrector output unreliable, the predictor/corrector model may be used to determine a fresh intake air flow estimation (based solely on the predictor estimation, with adjustment from the difference between the corrector and the predictor simply set to zero).

Thus, the methods and system described herein provide for an embodiment of a system comprising an engine having an intake manifold to receive fresh intake air; an exhaust gas recirculation (EGR) system to supply EGR to the intake manifold, flow of EGR through the EGR system controlled by one or more exhaust valves; and a controller configured to adjust a position of the one or more exhaust valves based on an estimated fresh intake air flow rate, where during a first set of operating conditions, the fresh intake air flow rate is estimated based on a total gas flow rate into the engine and further based on a current position of the one or more exhaust valves, intake manifold pressure, air-fuel ratio, and fuel flow to one or more cylinders of the engine.

In an example, the controller is configured to estimate the fresh intake air flow rate by: determining a first fresh intake air flow rate based on the total gas flow rate into the engine, the current position of the one or more exhaust valves, and intake manifold pressure; determining a second fresh intake air flow rate based on the total gas flow rate into the engine, air-fuel ratio, and fuel flow; and estimating the fresh intake air flow rate as the first fresh intake air flow rate corrected by the second fresh intake air flow rate.

The engine comprises a first group of cylinders fluidically coupled to the EGR system and a second group of cylinders fluidically coupled to an exhaust passage and not to the EGR system, and wherein the fuel flow to one or more cylinders of the engine comprises fuel flow to the first group of cylinders.

The first set of operating conditions comprises non-cold start engine operation at air-fuel ratio below a threshold. In one example, the threshold is an air-fuel ratio of about 80:1. The controller is configured to, during a second set of operating conditions, estimate the fresh intake air flow rate based on the total gas flow rate into the engine and further based on the current position of the one or more exhaust valves and intake manifold pressure. The second set of operating conditions comprises non-cold engine start operation and air-fuel ratio above the threshold.

The controller is configured to, during a third set of operating conditions, estimate the fresh intake air flow rate based only on the total gas flow rate into the engine. The third set of operating conditions comprises cold start engine operating conditions. The controller is configured to determine the total gas flow rate to the engine based on engine speed, exhaust pressure, intake manifold pressure, and intake manifold temperature.

In one example, if a determination of the current position of the one or more exhaust valves is unavailable (e.g., if a valve position feedback sensor is degraded), the controller is configured to estimate fresh intake air flow rate based on a map of compressor air flow as a function of pressure ratio across a compressor of a turbocharger, at a given turbocharger speed.

Another embodiment of a system comprises an engine having an intake manifold to receive fresh intake air; an exhaust gas recirculation (EGR) system to supply EGR to the intake manifold, flow of EGR through the EGR system controlled by one or more exhaust valves; and a controller configured to adjust a position of the one or more exhaust valves based on an estimated fresh intake air flow rate, where during a first set of operating conditions, the fresh intake air flow rate is estimated based on a total air flow rate into the engine and further based on a current position of the one or more exhaust valves and exhaust NOx concentration.

In an example, the first set of operating conditions comprises non-cold start engine operation at low engine load and high air-fuel ratio.

The controller is configured to estimate the fresh intake air flow rate based total air flow rate into the engine and further based on the current position of the one or more exhaust valves and exhaust NOx concentration by: determining a first fresh intake air flow rate based on the total air flow rate into the engine and the current position of the one or more exhaust valves; determining a second fresh intake air flow rate based on the total air flow rate into the engine, exhaust NOx concentration, and one or more of engine speed, fuel flow to one or more cylinders of the engine, and ambient humidity; and estimating the fresh intake air flow rate as the first fresh intake air flow rate corrected by the second fresh intake air flow rate.

The engine comprises a first group of cylinders fluidically coupled to the EGR system and a second group of cylinders fluidically coupled to an exhaust passage and not to the EGR system, and the fuel flow to one or more cylinders of the engine comprises fuel flow to the first group of cylinders.

The controller is configured to, during a second set of operating conditions, estimate the fresh intake air flow rate based the total air flow rate into the engine and further based on the current position of the one or more exhaust valves, intake manifold pressure, air-fuel ratio, and fuel flow to cylinders of the engine. In an example, the second set of operating conditions comprises non-cold start engine operation at low air-fuel ratio.

The controller is configured to estimate the fresh intake air flow rate based total air flow rate into the engine and further based on the current position of the one or more exhaust valves, intake manifold pressure, air-fuel ratio, and fuel flow to the cylinders by: determining a first fresh intake air flow rate based on the total air flow rate into the engine, the current position of the one or more exhaust valves, and intake manifold pressure; determining a second fresh intake air flow rate based on the total air flow rate into the engine, air-fuel ratio, and the fuel flow to the cylinders; and estimating the fresh intake air flow rate as the first fresh intake air flow rate corrected by the second fresh intake air flow rate.

The controller is configured to, during a third set of operating conditions, estimate the fresh intake air flow rate based only on the total air flow rate into the engine. In an example, the third set of operating conditions comprises cold start engine operating conditions. The controller is configured to determine the total air flow rate to the engine based on engine speed, exhaust pressure, intake manifold pressure, and intake manifold temperature.

The methods and system described herein also provide for an embodiment of a method, comprising: during a first mode of operation, estimating a first fresh intake air flow rate to an engine based on a volumetric efficiency estimation; during second mode of operation, estimating a second fresh intake air flow rate to the engine based on a combination of a transient flow estimation and a steady state flow estimation, where the steady state flow estimation is selected from among a plurality of different steady state flow estimations, and the plurality of different steady state flow estimations differ in at least one or more inputs used to calculate each respective steady state flow estimation.

In an example, the first mode of operation comprises engine operation without exhaust gas recirculation (EGR), and the second mode of operation comprises engine operation with EGR.

Estimating the first fresh intake air flow rate to the engine based on the volumetric efficiency estimation comprises estimating the first fresh intake air flow rate to the engine based on engine speed, exhaust pressure, intake manifold pressure, and intake manifold temperature. The transient flow estimation estimates a third fresh intake air flow rate based on the volumetric efficiency estimation adjusted for EGR flow rate, where the EGR flow rate is estimated based on current EGR valve position and intake manifold pressure.

The plurality of steady state flow estimations comprises: a first steady state flow estimation that estimates a fourth fresh intake air flow rate based on air-fuel ratio and fuel flow to the engine; a second steady state flow estimation that estimates a fifth fresh intake air flow rate based on a map of compressor air flow as a function of pressure ratio across a compressor of a turbocharger, at a given turbocharger speed; and a third steady state flow estimation that estimates a sixth fresh intake air flow rate based on the volumetric efficiency estimation adjusted for EGR flow rate, where the EGR flow rate is estimated based on exhaust NOx concentration.

In one example, selecting the steady state flow estimation from among the plurality of steady state flow estimations comprises selecting the first steady state flow estimation if air-fuel ratio is below a threshold and selecting the second or third steady state flow estimation if air-fuel ratio is above the threshold.

In another example, selecting the steady state flow estimation from among the plurality of steady state flow estimations comprises estimating a respective fresh intake air flow rate using each of the plurality of steady state flow estimations, and selecting the steady state flow estimation that outputs the lowest fresh intake air flow rate. The method further comprises controlling a position of one or more exhaust valves based on the first fresh air flow rate or the second fresh air flow rate.

The methods and system described herein also provide for an embodiment of a system, comprising: an engine having an intake manifold to receive fresh intake air; an exhaust gas recirculation (EGR) system to supply EGR to the intake manifold, flow of EGR through the EGR system controlled by one or more exhaust valves; and a controller. The controller is configured to: during engine operation where no EGR is flowing to the intake manifold, estimate a fresh intake air flow rate based on engine speed, exhaust pressure, intake manifold pressure, and intake manifold temperature; during steady state engine operation where EGR is flowing to the intake manifold and air-fuel ratio is below a threshold air-fuel ratio, estimate a fresh intake air flow rate based on at least air-fuel ratio and fuel flow to the engine; and during steady state engine operation where EGR is flowing to the intake manifold and air-fuel ratio is above the threshold air-fuel ratio, estimate a fresh intake air flow rate based on at least engine speed, exhaust pressure, intake manifold temperature, intake manifold pressure, and a position of the one or more exhaust valves.

During steady state engine operation where EGR is flowing and air-fuel ratio is below the threshold air-fuel ratio, the controller is configured to estimate the fresh intake air flow rate based further on a position of the one or more exhaust valves and intake manifold pressure.

During transient engine operation, the controller is configured to estimate a fresh intake air flow rate based on at least engine speed, exhaust pressure, intake manifold temperature, intake manifold pressure, and a position of the one or more exhaust valves. The controller is configured to control a position of the one or more exhaust valves based on the fresh intake air flow rate.

As used herein, transient operation may refer to engine operation where at least one operating parameter is changing by a threshold amount over time. The at least one operating parameter may include engine speed, engine load, EGR rate, reference intake oxygen concentration, fuel flow, or other parameters. In contrast, steady-state operation may refer to engine operation where the at least one operating parameter is not changing, e.g., is remaining relatively constant. In a specific example, transient operation may include an operator changing a notch throttle setting, while steady-state operation may include notch throttle setting remaining constant.

In another embodiment, a system comprises an engine having an intake manifold to receive fresh intake air, an exhaust gas recirculation (EGR) system to supply EGR to the intake manifold, and a controller. Flow of EGR through the EGR system is controlled by one or more exhaust valves. The controller is configured, during a first set of operating conditions, to estimate a fresh intake air flow rate based on a total gas flow rate into the engine, respective one or more current positions of the one or more exhaust valves, an intake manifold pressure, an air-fuel ratio, and fuel flow to one or more cylinders of the engine. The controller is further configured to adjust the respective one or more current positions of the one or more exhaust valves based on the fresh intake air flow rate that is estimated.

In another embodiment, a method comprises estimating, with a controller, a fresh intake air flow rate of fresh intake air into an intake manifold of an engine, based on an intake manifold pressure, an air-fuel ratio, fuel flow to one or more cylinders of the engine, a total gas flow rate into the engine, and a current position of one or more exhaust valves of an exhaust gas recirculation (EGR) system that is configured to supply EGR to the intake manifold. The flow of EGR through the EGR system is controlled by the one or more exhaust valves. The method further comprises adjusting, with the controller, the current position of the one or more exhaust valves based on the fresh intake air flow rate that is estimated.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
   with a controller, during a first mode of operation, estimating a first fresh intake air flow rate to an engine based on a volumetric efficiency estimation, the engine having an intake manifold to receive fresh intake air and an exhaust gas recirculation (EGR) system to supply EGR to the intake manifold, flow of EGR through the EGR system controlled by one or more exhaust valves; and
   with the controller, during a second mode of operation, estimating a second fresh intake air flow rate to the engine based on a combination of a transient flow estimation and a steady state flow estimation, where the steady state flow estimation is selected from among a plurality of different steady state flow estimations, and the plurality of different steady state flow estimations differ in at least one or more inputs used to calculate each respective steady state flow estimation.

2. The method of claim 1, wherein the first mode of operation comprises engine operation without EGR, and wherein the second mode of operation comprises engine operation with EGR.

3. The method of claim 1, wherein estimating the first fresh intake air flow rate to the engine based on the volumetric efficiency estimation comprises estimating the first fresh intake air flow rate to the engine based on engine speed, exhaust pressure, intake manifold pressure, and intake manifold temperature.

4. The method of claim 1, wherein the transient flow estimation estimates a third fresh intake air flow rate based on the volumetric efficiency estimation adjusted for EGR flow rate, where the EGR flow rate is estimated based on current EGR valve position and intake manifold pressure.

5. The method of claim 1, wherein the plurality of different steady state flow estimations comprises:
   a first steady state flow estimation that estimates a fourth fresh intake air flow rate based on an air-fuel ratio and fuel flow to the engine;
   a second steady state flow estimation that estimates a fifth fresh intake air flow rate based on a map of compressor air flow as a function of pressure ratio across a compressor of a turbocharger, at a given turbocharger speed; and
   a third steady state flow estimation that estimates a sixth fresh intake air flow rate based on the volumetric efficiency estimation adjusted for EGR flow rate, where the EGR flow rate is estimated based on exhaust NOx concentration.

6. The method of claim 5, wherein the steady state flow estimation is selected from among the plurality of different steady state flow estimations by selecting the first steady state flow estimation if the air-fuel ratio is below a threshold and selecting the second or third steady state flow estimation if the air-fuel ratio is above the threshold.

7. The method of claim 5, wherein the steady state flow estimation is selected from among the plurality of different steady state flow estimations by estimating a respective fresh intake air flow rate using each of the plurality of steady state flow estimations, and selecting the steady state flow estimation that outputs the lowest fresh intake air flow rate.

8. The method of claim 1, further comprising, with the controller, controlling one or more positions of the one or more exhaust valves based on the first fresh intake air flow rate or the second fresh intake air flow rate.

9. A system comprising:
   an engine having an intake manifold to receive fresh intake air;
   an exhaust gas recirculation (EGR) system to supply EGR to the intake manifold, flow of EGR through the EGR system controlled by one or more exhaust valves; and
   a controller configured, during a first mode of operation, to estimate a first fresh intake air flow rate to an engine based on a volumetric efficiency estimation,
   wherein the controller is further configured, during a second mode of operation, to estimate a second fresh intake air flow rate to the engine based on a combination of a transient flow estimation and a steady state flow estimation, where the steady state flow estimation is selected from among a plurality of different steady state flow estimations, and the plurality of different steady state flow estimations differ in at least one or more inputs used to calculate each respective steady state flow estimation.

10. The system of claim 9, wherein the first mode of operation comprises engine operation without EGR, and wherein the second mode of operation comprises engine operation with EGR.

11. The system of claim 9, wherein the controller is configured to estimate the first fresh intake air flow rate to the engine based on the volumetric efficiency estimation by estimating the first fresh intake air flow rate to the engine based on engine speed, exhaust pressure, intake manifold pressure, and intake manifold temperature.

12. The system of claim 9, wherein the controller is configured to determine the transient flow estimation as an estimation of a third fresh intake air flow rate based on the volumetric efficiency estimation adjusted for EGR flow rate, where the EGR flow rate is estimated based on current EGR valve position and intake manifold pressure.

13. The system of claim 9, wherein the plurality of different steady state flow estimations comprises:
   a first steady state flow estimation that estimates a fourth fresh intake air flow rate based on an air-fuel ratio and fuel flow to the engine;
   a second steady state flow estimation that estimates a fifth fresh intake air flow rate based on a map of compressor air flow as a function of pressure ratio across a compressor of a turbocharger, at a given turbocharger speed; and
   a third steady state flow estimation that estimates a sixth fresh intake air flow rate based on the volumetric efficiency estimation adjusted for EGR flow rate, where the EGR flow rate is estimated based on exhaust NOx concentration.

14. The system of claim 13, wherein the controller is configured to select the steady state flow estimation from among the plurality of different steady state flow estimations by selecting the first steady state flow estimation if the air-fuel ratio is below a threshold and selecting the second or third steady state flow estimation if the air-fuel ratio is above the threshold.

15. The system of claim 13, wherein the controller is configured to select the steady state flow estimation from among the plurality of different steady state flow estimations by estimating a respective fresh intake air flow rate using each of the plurality of steady state flow estimations, and selecting the steady state flow estimation that outputs the lowest fresh intake air flow rate.

16. The system of claim 9, wherein the controller is further configured to control one or more positions of the one or more exhaust valves based on the first fresh intake air flow rate or the second fresh intake air flow rate.

17. A method, comprising:
   during a first mode of operation, estimating a first fresh intake air flow rate to an engine based on a volumetric efficiency estimation; and
   during a second mode of operation, estimating a second fresh intake air flow rate to the engine based on a combination of a transient flow estimation and a steady state flow estimation, where the steady state flow estimation is selected from among a plurality of different steady state flow estimations, and the plurality of different steady state flow estimations differ in at least one or more inputs used to calculate each respective steady state flow estimation.

18. The method of claim 17, wherein the first mode of operation comprises engine operation without exhaust gas recirculation (EGR), and wherein the second mode of operation comprises engine operation with EGR.

19. The method of claim 17, wherein estimating the first fresh intake air flow rate to the engine based on the volumetric efficiency estimation comprises estimating the first fresh intake air flow rate to the engine based on engine speed, exhaust pressure, intake manifold pressure, and intake manifold temperature.

20. The method of claim 17, wherein the transient flow estimation estimates a third fresh intake air flow rate based on the volumetric efficiency estimation adjusted for EGR flow rate, where the EGR flow rate is estimated based on current EGR valve position and intake manifold pressure.

* * * * *